Nov. 20, 1934.                B. C. RIBLET                1,981,196
                                 WHEEL
                           Filed Nov. 2, 1932

BYRON C. RIBLET
*Inventor*

By *Herbert E. Smith*
*Attorney*

Patented Nov. 20, 1934

1,981,196

UNITED STATES PATENT OFFICE 1,981,196

WHEEL

Byron C. Riblet, Spokane, Wash.

Application November 2, 1932, Serial No. 640,891

3 Claims. (Cl. 64—17)

My present invention relates to improvements in wheels of the demountable rim type, particularly to sheaves or pulleys, and while the wheel of my invention is especially designed for use in overhead cable-trams and similar apparatus employing wire cables, traveling buckets etc., the principles of the invention may be adapted for use in the construction of wheels for various other purposes.

In carrying out my invention I provide a demountable tread portion or rim for the wheel, which rim is securely mounted in the wheel for use. When worn, the demountable rim may with facility and dispatch be removed, and with equal facility a new rim may be substituted for the worn rim, for continued use of the wheel, sheave, or pulley.

As is well known, in the construction and operation of aerial trams, or overhead systems for buckets traveling on wire cables between towers, pulleys and sheaves are employed to reduce friction on the cables due to the travel of the buckets, and other pulleys are employed to support the traveling cable or cables of the system.

The continuous, frictional contact of the sheaves with the cable rapidly wears the latter, and the consequent cost of repair and replacement of the worn cable consumes considerable time and heavy expense.

To eliminate the heavy cost of repair and replacement, due to consumption of time, labor and materials, of the cables, I provide the sheaves with a demountable and replaceable rim, preferably of metal that is softer than the wire cable or cables, in order that the wear, due to friction, may fall upon the sheaves rather than on the cable, and thus prolong the life of the cable or cables.

My invention consists in certain novel combinations and arrangements of parts of the sheave, including the demountable rim, as will hereinafter be more fully set forth and claimed. In the accompanying drawing I have illustrated one complete example of the physical embodiment of my invention in a sheave, in which the parts are combined and arranged according to the best mode I have thus far devised for the practical application of the principles of my invention. It will be understood that changes and alterations may be made in the exemplified structure, within the scope of my claims, without departing from the principles of my invention.

Figure 1:
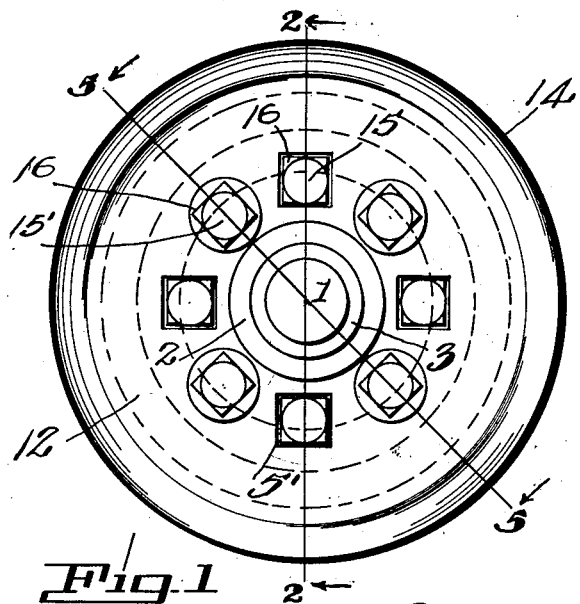
Figure 1 is a side view of a sheave embodying my invention.
Figure 2:
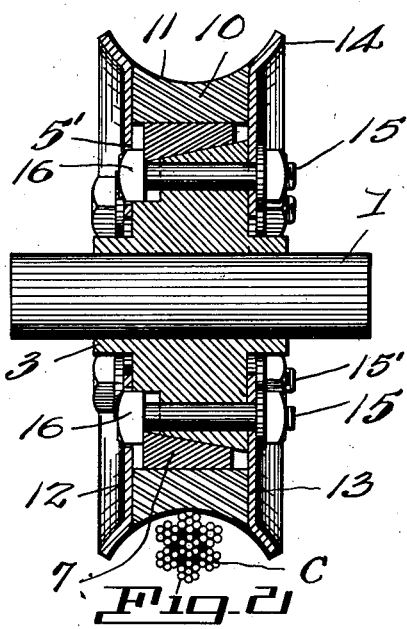
Figure 2 is a transverse section of the sheave at line 2—2 of Figure 1.
Figure 3:
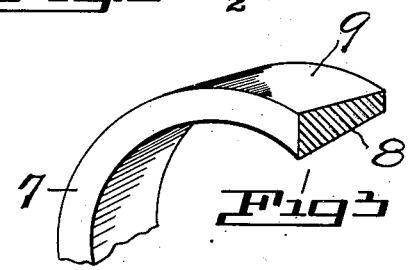
Figure 3 is a fragmentary view, in perspective of the wedge ring.
Figure 4:
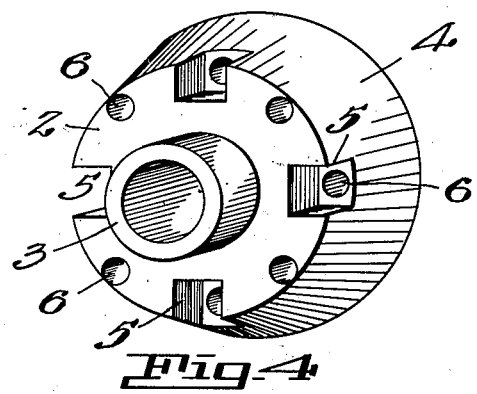
Figure 4 is a detail perspective view of the hub-section of the wheel.
Figure 5:
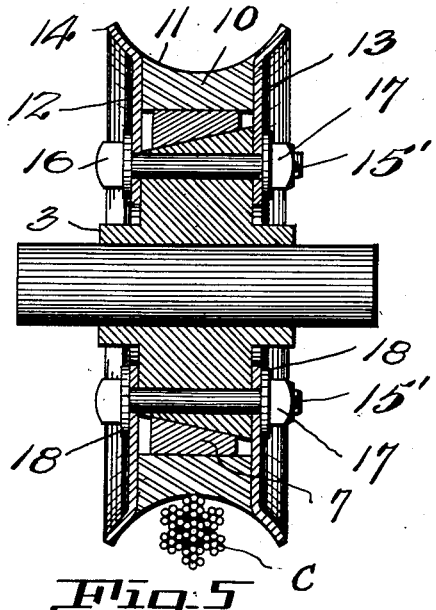
Figure 5 is a sectional view of the wheel at line 5—5 of Figure 1.

In Figures 2 and 5 the sheave is shown as supported on or traveling on a wire cable C, to illustrate its use as part of the equipment for an aerial tram way.

The sheave is provided with a spindle or shaft 1 with its journal ends projecting at opposite sides of the sheave, and this shaft is fixed in suitable manner in the hub section 2, that is fashioned, at opposite sides, with annular flanges 3, 3, to provide a wide area of contact between the shaft and the hub. The outer periphery of the hub, 4, is tapered by forming the hub in the shape of a truncated cone, and in the edges of the smaller face of the hub I provide a series of spaced recesses 5, which are provided with angular walls, and in which recesses the heads of retaining bolts are seated, as will be described. The hub is also provided with a series of transversely extending bolt holes 6, half of which holes are countersunk and alined with the four recesses 5. The number of recesses and the number of bolt-holes may be varied, depending on the number of bolts employed to clamp the parts of the wheel together, but for convenience I have here shown eight bolt holes and four recesses.

On the exterior periphery of the hub section a wedge ring 7 is mounted, which ring is provided with an inner, tapered annular face 8, complementary to the exterior taper of the hub, and the outer periphery of this wedge ring, as 9 is cylindrical. As shown, the wedge ring is slightly less in width than the hub, and the ring is adapted to be centered transversely of the hub. On the exterior cylindrical periphery 9 of the wedge ring, a demountable, or removable rim 10 is mounted, and this rim, which has a plane, inner, circular face complementary to the outer periphery of the wedge ring, is fashioned with an exterior concave surface or grooved face 11, which forms the tread portion that travels on, or which supports, the wire cable, as the case may be.

At opposite sides of the sheave a pair of side rings, as 12 and 13 are attached, and each of these side rings has an outwardly flaring, annular flange 14 conforming to the shape of the concave rim 10 and forming continuations of the annular groove of the sheave, for guiding the sheave as it travels on the cable, or for guiding the cable as it travels over the sheave. The open centers of these side rings are of sufficient size to fit over the hub-flanges, and the rings lie flat against the flush sides of the hub and the rim.

I have designated two sets of four bolts each, as 15 and 15' which are provided with square or angular heads 16, nuts 17, and washers 18. The set of bolts designated 15 pass through bolt holes in ring 13 and in the hub, and the heads 16 of these bolts are located in the recesses 5 of the hub and squared holes 5' of the side ring 12. As best seen in Figure 2 the inner faces of the heads of these bolts 15 frictionally engage the wider or back face of the wedge ring, and it will be apparent that while the bolt 15 is held against turning by the fit of its head in the recess 5, its nut 17 may be turned to draw the wedge ring into close frictional contact between the rim and the hub. Thus, as the face 8 of the wedge ring rides up the face 4 of the hub, the face 9 of the wedge ring is forced into close frictional contact with the inner annular face of the rim, and the latter is rigidly and securely held in position on the wedge ring. The side ring 13 thus provides a backing to resist lateral movement of the hub or the rim, and thereby insures a radial locking, by frictional contact, of the hub, the wedge ring and the rim.

The bolts 15' are employed to retain both the side rings in place, and these bolts pass through both side rings, which are provided with holes therefor, and through the hub, firmly anchoring both side rings against the opposite flush sides of the hub and of the rim, the washers 18 being used to assist in preventing rotation of the bolts or nuts.

In thus assembling the parts, the side ring 13 insures a perfect alinement of the hub and rim, as the wedge-ring is being drawn into locking position between these parts, and the wheel is properly trued, and firmly clamped together.

Suitable means are provided in the wedge ring to provide for contraction and expansion, and the metal of the ring possesses resiliency for this purpose. The wedge ring may be a split ring to allow for expansion and contraction, or other means may be provided to insure proper performance of its functions by the wedge ring.

Preferably the rim 10 is fashioned of comparatively soft metal that will wear more rapidly than the wire cable, thus reducing the wear on the cable while increasing the wear on the rim. The rim, however, when worn, may readily be dismounted and removed, and a fresh one substituted therefor to continue the life of the sheave. The other parts of the sheave may be fashioned of the standard hard metals adapted for the purpose, and the sheave as a whole is as durable as the ordinary sheaves now in use.

Having thus fully described my invention, what I claim as new and desire to secure by Letters Patent is:—

1. The combination in a sheave having a demountable rim, a hub, and an intermediate locking ring, of a side ring, bolts having angular heads engaging the locking ring and located in recesses in the hub, and said heads projecting through complementary angular holes in the side ring and exterior nuts on said bolts, a second side ring, and bolts passing through both side rings and the hub, for the purpose described.

2. The combination in a sheave having a demountable rim, a hub having a series of boltholes and a series of lateral angular recesses, and a tapered exterior periphery for the hub, an intermediate locking ring having an inner tapered periphery, a pair of opposed side-rings one of which side rings has holes complementary to the recesses, a set of bolts having their heads engaging the locking ring and located in said recesses and holes and projecting through the other side ring, nuts on said bolts exterior of said other side ring, and retaining bolts passing through both side rings and the hub.

3. The combination with a tapered hub, a rim, and an intermediate locking ring having a wedge face engaging the tapered hub, of a side ring engaging flush faces of the hub and rim, non-rotatable bolts joining said side ring and hub, heads on said bolts engaging the locking ring, a second side ring engaging the opposite faces of the hub and rim, and retaining bolts passed through said side rings and the hub.

BYRON C. RIBLET.